United States Patent [19]

Ohashi

[11] 4,134,142
[45] Jan. 9, 1979

[54] CASSETTE TAPE PLAYER

[75] Inventor: Tamaki Ohashi, Tokyo, Japan

[73] Assignee: Nihon Technical Kabushiki Kaisha, Tokyo, Japan

[21] Appl. No.: 810,704

[22] Filed: Jun. 29, 1977

[30] Foreign Application Priority Data

Jul. 2, 1976 [JP] Japan .................. 51-79369

[51] Int. Cl.² .............................................. G11B 15/32
[52] U.S. Cl. ............................................ 360/93; 242/198
[58] Field of Search .................... 360/96, 94, 93, 92, 360/71; 242/198-200

[56] References Cited

U.S. PATENT DOCUMENTS

| | | | |
|---|---|---|---|
| 2,951,914 | 9/1960 | Dubois | 360/96 |
| 3,800,320 | 3/1974 | Murakami | 360/93 |
| 3,875,590 | 4/1975 | Mandish | 360/93 X |
| 3,934,270 | 1/1976 | Iwata | 360/96 |
| 3,999,219 | 12/1976 | Andrews | 360/93 X |

*Primary Examiner*—John H. Wolff
*Attorney, Agent, or Firm*—William E. Jackson

[57] ABSTRACT

This invention relates to a cassette tape player comprising a fixed frame and a movable frame which is slidable with respect to said fixed frame in such a manner as that of a drawer. The fixed frame is provided with such electric systems as a motor and magnetic head; said movable frame is provided with a capstan, pinch roller, reel shafts and a driving system for driving and connecting these members. When the tape is stuck around the capstan and the pinch roller, the movable frame is drawn to remove the tape easily from the fixed frame and, at the same time, a burn-out of lead wire may be prevented.

4 Claims, 6 Drawing Figures

CASSETTE TAPE PLAYER

BACKGROUND OF THE INVENTION

This invention relates to an improved cassette tape player, and more particularly to a cassette tape player which is most suitable for use in the dash board of a motor vehicle.

At present, various kinds of cassette tape players are used due to their convenience in usage. However, many of the prior art tape players have a disadvantage in which they require disassembly from the car for maintenance or repair when the magnetic tape of the cassette is stuck around the capstan or pinch roller. Further, there is another disadvantage in which a long time non-usage condition of the player causes a deformation of the resilient material arranged around the outer circumference of the roller coaxial with the pulley contained in the cassette tape driving system due to close contact of the material with the rotating shaft of the motor, this information causes a fluctuation in the rotation of the capstan and deterioration of performance of the tape player.

This invention is improved to eliminate the above mentioned disadvantages.

Thus, it is a main object of the present invention to provide a cassette tape player in which a tape may be easily removed without removing the cassette tape player. Another object is to facilitate the repairing the same and to prevent a burn-out of the lead wire when the tape is stuck around the capstan and pinch roller.

It is another object of the present invention to provide a cassette tape player in which a cassette tape driving system is improved such that the performance of the tape player may be maintained for a long-term stable condition.

Other objects of the present invention will become apparent from the following description of the preferred embodiment of the present invention and the attached drawings.

SUMMARY OF THE INVENTION

The present invention is a cassette tape player characterised in that a fixed frame is provided with a motor and a magnetic head, a movable frame which is slidable with respect to said fixed frame in such a manner as that of a drawer is provided with a capstan, pinch roller and reel shafts, and when a cassette is installed on said reel shafts and said movable frame is pushed into said fixed frame, said motor is operated and said capstan and reel shafts are operated via a driving system. As described above, according to the present invention, if the tape is stuck around the capstan or pinch roller, the tape may be easily removed by pulling out only the movable frame without removing or disassembling the cassette tape player. And since the electric systems as motor and magnetic head are installed in the fixed frame, it is possible to prevent a generation of burn-out of lead wire due to its movement.

DESCRIPTION OF THE DRAWINGS

The attached drawings show the preferred embodiments of the present invention, in which.

FIG. 1 is a top sectional view showing an interior structure of a movable frame with the same being drawn out of the player.

FIG. 2 is a top sectional view of the movable frame with the same being pushed in the player.

FIG. 3 is a side sectional view showing a condition in which a cassette is installed on the reel shafts and the movable frame is pushed into the player.

FIG. 4 is a front perspective view of the movable frame with the same being pushed into the player.

FIG. 5 is a front perspective view of the movable frame with the same being pulled out from the condition of FIG. 4.

FIG. 6 is a front perspective view of a cassette installed on the reel shafts in a condition shown in FIG. 5.

DESCRIPTION OF THE PREFERRED EMBODIMENT

At first, in FIGS. 1 to 6 is illustrated an embodiment of a cassette tape player of the present invention. For convenience of illustration or clarity of the drawings, a pinch roller is eliminated in FIG. 3.

Figure 1:
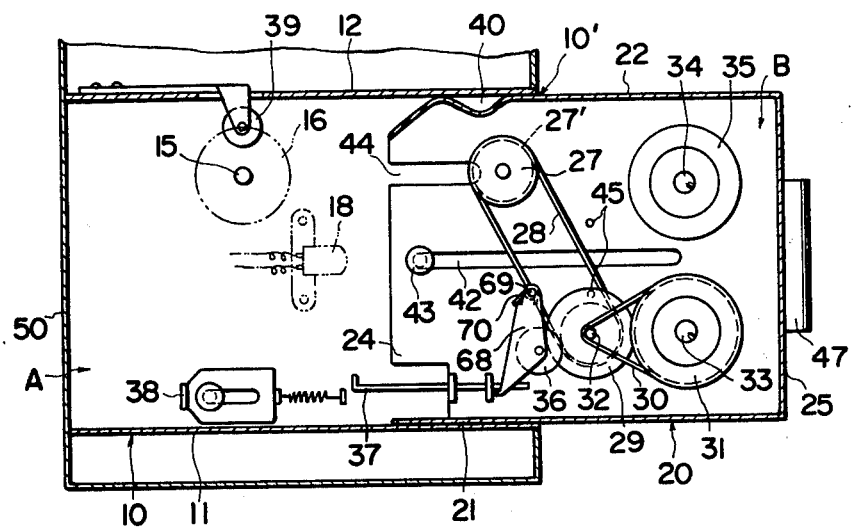
FIGS. 1 to 6 show one embodiment of the present invention.
Figure 2:
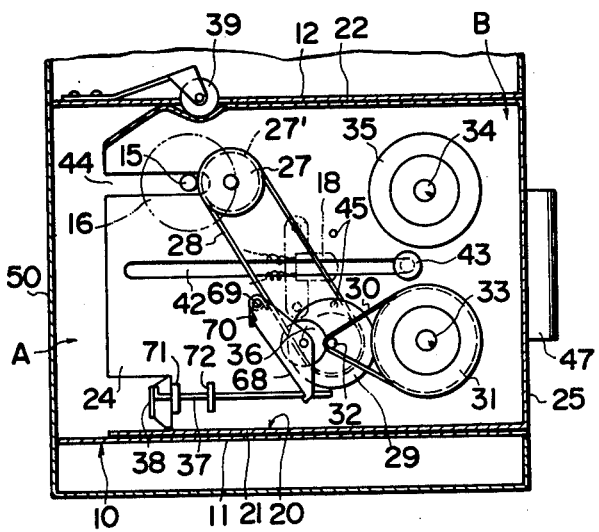
Figure 3:
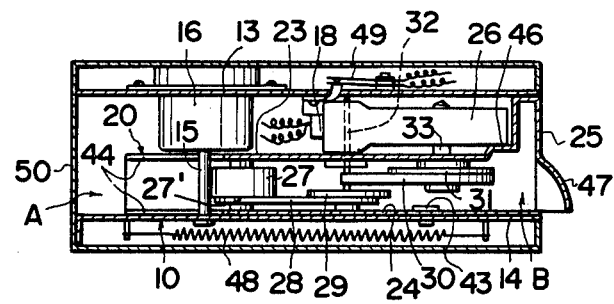
Figure 4:
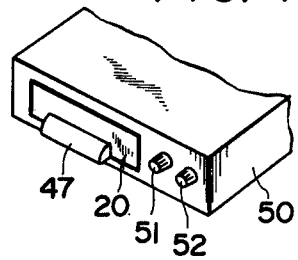
Figure 5:
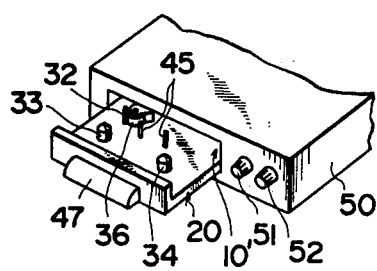
Figure 6:
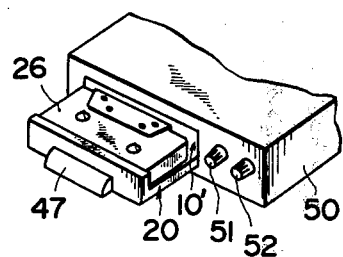

In the drawings, the reference numeral 10 generally indicates a fixed frame, said fixed frame 10 is comprised of a left side plate 11, a right side plate 12, an upper plate 13 and a lower plate 14. The front face of the fixed frame is formed with an opening 10'. Said upper plate 13 is provided with a motor 16 and a magnetic head 18, a rotating shaft 15 of said motor 16 is supported by said lower plate 14. Reference numeral 20 shows a movable frame and said movable frame 20 is comprised of a left side plate 21 and a right side plate 22 to be in sliding contact with each of the left side plate 11 and right side plate 12 of said fixed frame 10. Frame 20 also has a top plate 23 forming a suitable clearance between the same and the upper plate 13 of the fixed frame 10, and a bottom plate 24 in sliding contact with the lower plate 14 of the fixed frame 10. The front face of the movable frame is closed by a front plate 25. Said movable frame 20 is stored in the clearance A formed by said fixed frame 10 and, at the same time, the frame is slidable through its opening 10' with respect to said fixed frame 10 in such a manner as that of a drawer. Within a clearance B formed between the top plate 23 of said movable frame 20 and the bottom plate 24 is installed a cassette tape driving system for operating the tape in a cassette 26 by getting a rotational force from a rotating shaft 15 of said motor 16 or a rotating shaft cooperating therewith. Said driving system is comprised of a pulley 27' coaxial with a roller 27 having a resilient material around its outer circumference to be force abutted against the rotating shaft 15 of the motor 16 or a rotating shaft cooperating therewith, a flywheel 29 cooperating with pulley 27' via belt 28, and a take-up reel shaft pulley 31 cooperating with a rotating shaft of said flywheel 29 via belt 30. Both a rotating shaft of the pulley 27' coaxial with said roller 27 and a rotating shaft of the flywheel 29 are supported between the top plate 23 and bottom plate 24 of the movable frame 20, and said rotating shaft of said take-up reel shaft pulley 31 is supported by the top plate 23. Particulary, the rotating shaft of the flywheel 29 is projected out from top plate 23 to terminate in a capstan 32, and the rotating shaft of the take-up reel shaft pulley 31 is projected out from the top plate 23 to terminate in a reel shaft 33 for positioning the reel hub for taking-up the cassette 26. Reference numeral 34 shows a reel shaft for positioning the reel hub for feeding or supplying the tape of cassette 26 and the reel shaft is projected out from top plate 23 in the same way as that of said reel shaft 33, and the pulley 35 of said reel shaft 34 is stored in the clearance B between said top plate 23 and the bottom plate 24. And on said top plate 23 is arranged a pin roller 36 for driving the tape with the same being held between the top plate and the capstan 32. One end of the supporting member 68 for supporting said pinch roller 36 is pivoted to the movable frame 20 via a pivoting axis 69 around which a twisting coil spring 70 is wound and so, in a condition in which the movable frame 20 is drawn out from the clearance A of the fixed frame 10, as shown in FIG. 1, the supporting member 68 of said pinch roller 36 is oscillated around the pivoted shaft 69 in a clockwise direction by a resilient force of said twisting coil spring 70 and the pinch roller 36 is held apart from the capstan 32. Thus the installation of the cassette 26 to the reel shafts 33 and 34 is not interfered with by the pinch roller 36. The other end of the supporting member for supporting said pinch roller 36 is connected to one and an operating rod 37. Said operating rod 37 is slidably held in horizontal direction on the supporting pieces 71–72 provided on the movable frame 20. Reference numeral 38 illustrates a stopper piece provided on the fixed frame 10 so as to cause the same to be engagable by the end of said operating rod 37. As shown in FIG. 1, the stopper piece 38 is provided with a tension spring. When the movable frame 20 positioned as shown in FIG. 1 is pushed into the clearance A of the fixed frame 10 as shown in FIG. 2, the operating rod 37 is moved along with the movable frame 20 and abutted against the stopper piece 38, but since the movable frame 20 continues to move, the operating rod 37 is pushed back by the stopper piece 38. Due to this operating relation, the supporter member 68 for pinch roller 36 is oscillated around the pivot shaft 69 in anti-clockwise direction and the pinch roller 36 is press abutted against the capstan 32. In order to hold the movable frame 20 in a condition shown in FIG. 2, the right side plate 22 of the movable frame 20 is provided with recess 40 for use in engaging the holding roller 39 attached to the right side plate 12 of the fixed frame 10. Reference numeral 42 shows a longitudinal hole formed at the bottom plate 42 of the movable frame 20 and the axial pin 43 provided at the lower plate 14 of the fixed frame 10 is engaged with said longitudinal hole 42. This operational relation restricts the pull out of the movable frame 20 and overpushing operation thereof. Reference numeral 44 shows slits for guiding the rotating shaft 15 so as to cause a close contact of the rotating shaft 15 of the motor 16 with the roller 27 coaxial with the pulley 27' when the movable frame 20 is pushed into the clearance A of the fixed frame 10. The sits 44 are provided at the top plate 23 and the bottom plate 24 of the movable frame 20. Reference numeral 45 illustrates a pair of tape guide pins projected at the top plate 23 of the movable frame 20. Reference numeral 46 indicates a projection formed by projecting a portion of the top plate 23 in order to hold the cassette 26 installed in the movable frame 20 (see FIGS. 3 and 6) in horizontal direction and reference numeral 47 shows a grip formed at the front plate 25 of the movable frame 20 and used for pulling out the movable frame. Said front plate 25 closes an opening 10' of the fixed frame 10 when the movable frame 20 is pushed into the fixed frame 10. Reference numeral 48 shows a spring for providing a constant biasing force on the movable frame 20 toward the opening 10' of the fixed frame 10 and reference numeral 49 indicates a switch to be contacted with a portion of the cassette, being operated thereby to complete an electric circuit for electric systems such as motor 16 when the cassette is installed and the movable frame 20 is pushed into the player. All of the fixed frame 10 described above is stored in a casing 50 and the casing 50 is provided with a knob 51 for adjusting volume of sound and a knob 52 for use in a main switch as shown in FIGS. 4 to 6. FIG. 4 shows a condition in which the movable frame 20 is pushed into the player and the condition is provided when the tape player is not used or used. As can be seen from a condition in FIG. 5 for showing the condition in which the movable frame 20 is drawn out from the player in order to install the cassette 26, both capstan 32 and pinch roller 36 are projected out near the opening 10' of the fixed frame 10. A condition in which the cassette 26 is installed under this condition is shown in FIG. 6. When the movable frame 20 is pushed into the player from this condition, the movable frame comes to a condition shown in FIG. 4.

As can be easily appreciated from the above description, the preferred embodiment of the present invention in FIGS. 1 to 6 is made such that the fixed frame is provided with a motor and a magnetic head and further the movable frame is provided with a capstan and a pinch roller. Thus the capstan and pinch roller may also be pulled out to a place where the operator's hand may touch with them when the movable frame is pulled out from the player. Thus, even if the tape is stuck around the capstan and pinch roller, the tape may easily be removed from the player, so it may not be required to provide a troublesome handling such as removing the tape player from the dash board and disassembling the same. Further, due to the fact that the fixed frame is provided with an electric system such as motor and magnetic head, there may be not expected any accidents of burn-out of the lead wire after movement of the same.

The invention may be embodied in other specific forms without departing from its spirit or essential characteristic. The above-mentioned embodiment is, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What I claim is:

1. In a tape cassette player having a fixed frame, motor means and a magnetic head mounted on said frame, a movable frame adapted to have a tape cassette removably mounted thereon, means mounting said movable frame on said fixed frame for relative movement therebetween from a first position wherein a tape cassette may be mounted or removed from said movable frame, to a second position wherein a portion of the tape is engaged with said magnetic head, and driving system means connected to said motor means and being adapted to move the tape past said magnetic head, the improvement wherein:

said driving system means comprises: at least one reel shaft adapted to engage a reel of the tape cassette; means rotatably mounting said reel shaft on said movable frame; a capstan adapted to engage one side of the tape; means rotatably mounting said capstan on said movable frame; a rotatable pinch roller adjacent to said capstan and being adapted for movement toward said capstan to hold the tape against said capstan and being adapted for movement away from said capstan to release the tape from said capstan; means for movably mounting said rotatable pinch roller on said movable frame; and motion-transmitting means connected to said pinch roller mounting means for moving said pinch roller toward said capstan when said movable frame is moved to said second position and for moving said pinch roller away from said capstan when said movable frame is moved to said first position.

2. The invention of claim 1, wherein said means for movably mounting said pinch roller on said movable frame is a supporting member with said rotatable pinch roller mounted thereon and means pivotally connecting said supporting member to said movable frame.

3. The invention of claim 2, wherein said motion-transmitting means comprises an elongated operating rod, means for connecting a first end of said rod to said supporting member for said pinch roller, means for mounting said rod for slidable longitudinal movement with respect to said fixed and movable frames, resilient stop means mounted on said fixed frame and adapted to engage a second end of said operating rod when said movable frame is moved to said second position so that said pinch roller is resiliently based against said capstan when said movable frame is in the second position.

4. The invention of claim 3, wherein said motion-transmitting means further comprises means connected to said supporting member for resiliently biasing said pinch roller away from said capstan when said movable frame is in said first position so that the tape can be mounted or removed from between said pinch roller and capstan when said movable frame is in said first position.

* * * * *